United States Patent Office 3,823,006
Patented July 9, 1974

3,823,006
METHOD FOR SELECTIVE WEED CONTROL IN BEETS
Walter Lorenz, Wuppertal-Cronenberg, and Ludwig Eue and Helmuth Hack, Cologne, Germany, assignors to Farbenfabriken Bayer Aktiengesellschaft, Leverkusen, Germany
No Drawing. Filed Oct. 15, 1971, Ser. No. 189,742
Claims priority, application Germany, Oct. 30, 1970, P 20 53 333.9
Int. Cl. A01n 9/22
U.S. Cl. 71—94                                      1 Claim

ABSTRACT OF THE DISCLOSURE

Herbicidal compositions containing, as an active ingredient a N-substituted N',N'-alkylene urea of the formula

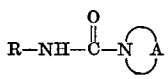

in which

A is alkylene of from 2 to 6 carbon atoms, and
R is unbranched or branched alkyl of from 1 to 6 carbon atoms, alkenyl of from 2 to 6 carbon atoms, cycloalkyl of from 4 to 12 carbon atoms, or unsubstituted and substituted aryl wherein the substituents are one or more of halogen, alkyl, alkoxy and alkyl mercapto;

are singularly effective, and particularly are suitable for selective weed control in beet cultivations.

---

The present invention relates to herbicidal compositions containing N-substituted N',N'-alkylene-urea compounds and to the use of such compounds as herbicides.

It is known that N-methyl-N'-(2-benzthiazolyl) urea can be used as selective herbicides, see, e.g., U.S. Patent Specification 2,756,135. As is also known, from British Patent Specification 1,004,469, this active compound is particularly suitable for weed control in beets. Furthermore, it is known that a mixture of N-cyclooctyl-N',N'-dimethyl urea and N-(3-chlorophenyl)-(1-butin-3-yl)-carbamate (ratio 16:11) can be used for weed control in sugar-beet. (See Deutsche Auslegeschrift (German Published Specification) 1,062,482.)

Heretofore, within the group of compounds described as urea compounds, only a single compound, namely the aforementioned N-methyl-N'-(2-benzthiazolyl)-urea, was known as a selective beets herbicides. It was, therefore, extraordinarily surprising that, in accordance with the present invention, other urea derivatives were discovered which are suitable for selective weed control, for example in beets and, in addition, are superior to the previously known active compounds in activity and compatibility.

The compounds used in this invention are N-substituted N',N'-alkylene ureas of the formula

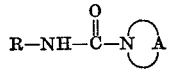

(I)

in which

A is alkylene of from 2 to 6 carbon atoms, and
R is unbranched or branched alkyl of from 1 to 6 carbon atoms, alkenyl of from 2 to 6 carbon atoms, cycloalkyl of from 4 to 12 carbon atoms, or unsubstituted and substituted aryl wherein the substituents are one or more of halogen, alkyl, alkoxy and alkyl mercapto.

Preferably, A is alkylene of from 4 to 5 carbon atoms; R is preferably alkyl of from 1 to 4 carbon atoms, alkenyl of from 2 to 4 carbon atoms, cyclohexyl or optionally substituted (with one or more chlorine, bromine, methyl, ethyl, methoxy, ethoxy, methylmercapto and/or ethylmercapto groups) phenyl.

The invention therefore provides herbicidal compositions containing as active ingredient a compound of formula (I) in admixture with a solid or liquefied gaseous diluent or carrier or in admixture with a liquid diluent or carrier containing a surface-active agent.

The invention also provides a method of combating weeds which comprises applying to the weed or a habitat thereof a compound of formula (I) alone or in the form of a composition containing as active ingredient a compound of formula (I) in admixture with a diluent or carrier.

Surprisingly, the compounds according to the invention posses strong herbicidal properties. This was not predictable since various of the previously known compounds, for example N-(3-chlorophenyl)-N',N'-pentamethylene urea (compound (5) below) and N-phenyl-N',N'-pentamethylene urea (compound (1) below) have been investigated in special growth tests and only moderate growth-influencing properties were found (cf. Botan. Gaz. 107, 476–507 (1946)).

It is also very surprising that the active compounds used according to the invention are considerably superior in their herbicidal, in particular selective herbicidal, properties, to the structurally most closely related compounds having the same type of activity known in the art. Thus, the instant compounds exhibit, e.g., in the control of weeds in beets, a higher selective herbicidal activity than N-methyl-N'-(2-benzthiazolyl)-urea and the mixture of N-cyclooctyl-N',N'-dimethyl-urea and N-(3-chlorophenyl)-(butin-3-yl)-carbamate, especially when they are applied according to the pre-emergence process.

The active compounds used according to the invention therefore represent a valuable enrichment of the art.

As examples of the compounds which can be used according to the invention there can be mentioned in particular:

N-ethyl-N',N'-tetramethylene-urea
N-ethyl-N',N'-pentamethylene-urea
N-propyl-N',N'-tetramethylene-urea
N-propyl-N',N'-pentamethylene-urea
N-iso-propyl-N',N'-tetramethylene-urea
N-iso-propyl-N',N'-pentamethylene-urea
N-butyl-N',N'-tetramethylene-urea
N-butyl-N',N'-pentamethylene-urea
N-tert.-butyl-N',N'-tetramethylene-urea
N-tert.-butyl-N',N'-pentamethylene-urea
N-allyl-N',N'-tetramethylene-urea
N-allyl-N',N'-pentamethylene-urea
N-propenyl-N',N'-tetramethylene-urea
N-propenyl-N',N'-pentamethylene-urea
N-butenyl(2)-N',N'-tetramethylene-urea
N-butenyl(2)-N',N'-pentamethylene-urea
N-cyclohexyl-N',N'-tetramethylene-urea
N-cyclohexyl-N',N'-pentamethylene-urea
N-(3,4-dichlorophenyl)-N',N'-tetramethylene-urea
N-(3,4-dichlorophenyl)-N',N'-pentamethylene-urea
N-(3,4-dibromophenyl)-N',N'-tetramethylene-urea
N-(3,4-dibromophenyl)-N',N'-pentamethylene-urea
N-(4-methoxyphenyl)-N',N'-tetramethylene-urea
N-(4-methoxyphenyl)-N',N'-pentamethylene-urea
N-(4-methylmercaptophenyl)-N',N'-tetramethylene-urea
N-(4-methylmercaptophenyl)-N',N'-pentamethylene-urea
N-(4-bromophenyl)-N',N'-tetramethylene-urea
N-(4-bromophenyl)-N',N'-pentamethylene-urea.

Some of the substances to be used according to the invention are known, for example N-methyl-N',N'-pentamethylene-urea (see Ber. 17, 3040–1 (1884) and Botan. Gaz. 107, 476–507 (1946)).

Some of the substances according to the invention are novel; these are prepared in simple manner according to known processes. These compounds are obtained for example when isocyanates of the formula $$R-N=C=O \quad (II)$$

in which R has the meaning stated above, are reacted with cyclic amines of the formula

in which A has the meaning stated above, optionally in the presence of an inert solvent, such as benzene, toluene or 1,2-dichloroethane, at temperatures between —10° C. and 30° C., preferably between 0 and 20° C. Expediently, the starting materials are brought together in approximately equimolar amounts, with good cooling and stirring, within about 30 minutes; an excess of one or other of the reaction components is not harmful, but does not bring any substantial advantages either. The reaction products are isolated by (after further stirring for about half an hour) filtering off the separated crude products with suction, washing with fresh solvent and, finally, recrystallizing from a suitable solvent.

The following examples are illustrative.

EXAMPLE 1

Preparation of N-phenyl-N',N'-pentamethylene-urea

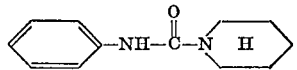

To a solution of 590 g. (5 moles) phenylisocyanate in 2500 ml. 1,2-dichloroethane there were added dropwise in the course of 30 minutes, with good cooling, 425 g. (5 moles) piperidine. After stirring for half an hour, the precipitated reaction product was filtered off with suction and it was afterwards briefly washed with 1,2-dichloroethane. A yellowish crystal powder of m.p. 168° C. was obtained.

Yield: 930 g. (95% of the theory) N-phenyl-N',N'-pentamethylene-urea.

The compound can be recrystallized from acetonitrile (1 g./10 ml.); compact needles are obtained, m.p. 168° C.

In analogous manner, the compounds listed in the following Table could be prepared:

TABLE I

| Example (and Compound) No. | Compound structure | Chemical name | Melting point (° C.) |
|---|---|---|---|
| (2) | | N-phenyl-N',N'-tetramethylene-urea. | 135 |
| (3) | | N-3-chlorophenyl-N',N'-tetramethylene-urea. | 141 |
| (4) | | N-methyl-N',-N'-tetramethylene-urea. | 122 |
| (5) | | N-3-chlorophenyl-N'-,N'-pentamethylene-urea. | 154 |
| (6) | | N-methyl-N',N'-pentamethylene-urea. | 68 |
| (7) | | N-cyclohexyl-N',N'-tetramethylene-urea. | [1] 139 |
| (8) | | N-cyclohexyl-N'-,N'-pentamethylene-urea. | [1] 142 |
| (9) | | N-(3,4-dichlorophenyl)-N'-,N'-pentamethylene-urea. | 175 |
| (10) | | N-(3,4-dichlorophenyl)-N'-N'-tetramethylene-urea. | 177 |
| (11) | | N-4-chlorophenyl-N'-,N'-pentamethylene-urea. | 176 |
| (12) | | N-4-chlorophenyl-N'-,N'-tetramethylene-urea. | 65 |
| (13) | | N-allyl-N'-,N'-pentamethylene-urea. | 100 |
| (14) | | N-allyl-N'-,N'-tetramethylene-urea. | 101 |
| (15) | | N-4-ethoxyphenyl-N'-,N'-pentamethylene-urea. | 143–144 |
| (16) | | N-4-ethoxyphenyl-N'-,N'-tetramethylene-urea. | 185 |

[1] Decomposition.

The active compounds according to the invention influence plant growth very strongly, but in differing manner, so that they can be variously used, especially as selective herbicides. For instance, it is possible for example to destroy weeds in beet cultivations, in accordance with this invention.

If the active compounds according to the invention are used in very high applied amounts, they ultimately have a total herbicidal effect.

By weeds in the widest sense are meant all plants which grow in places where they are not desired.

The active compounds according to the invention can be used for example in the case of the following plants: dicotyledons, such as mustard (*Sinapis*), cress, (*Lepidium*), cleavers (*Galium*), chickweed (*Stellaria*), chamomile (*Matricaria*), gallant soldier (*Galinsoga*), goosefoot (*Chenopodium*), annual nettle (*Urtica*), groundsel (*Senecio*), cotton (*Gossypium*), beets (*Beta*), carrots (*Daucus*), beans (*Coffea*); monocotyledons, such as timothy (*Phleum*), bluegrass (*Poa*), fescue (*Festuca*), Eleusine (*Eleusine*), foxtail (*Setaria*), ryegrass (*Lolium*), cheat (*Bromus*), barnyard grass (*Echinochloa*), maize (*Zea*), rice (*Oryza*), oats (*Avena*), barley (*Hordeum*), wheat (*Triticum*), millet (*Panicum*) and sugar cane (*Saccharum*).

The active compounds according to the invention are preferably used as selective herbicides. They exhibit a particularly good selectivity when applied in beet cultivation, but also in maize, cotton, peanut, potato and other cultivations.

The active compounds to be used according to the present invention can be converted into the usual formulations, such as solutions, emulsions, suspensions, powders, pastes and granulate. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulfoxide or acetonitrile, as well as water.

By liquefied gaseous diluents or carriers are meant liquids which would be gaseous at normal temperatures and pressures, e.g., aerosol propellants, such as halogenated hydrocarbons e.g., freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulfonates, alkyl sulfates and aryl sulfonates; preferred examples of dispersing agents include lignin, sulfite waste liquors and methyl cellulose.

The active compounds to be used according to the invention may be present in the formulations in admixture with other active compounds.

The formulations contain, in general, from 0.1 to 95, preferably 0.5 to 90, percent by weight of active compound.

The formulations may be diluted for actual application.

The active compounds may be applied as such or in the form of their formulations or of the application forms prepared the reform, such as ready-to-use solutions, emulsions, suspensions, powders, pastes and granulates. Application may take place in the usual manner, for example by dusting, spraying, squirting, watering or scattering.

The active compounds can be used both before the emergence and after the emergence of the plants.

In the case of use after the emergence, the concentration of active compound can be varied within fairly wide ranges. In general, compositions are applied, which have concentrations of active compound of 0.01 to 0.1, preferably 0.05 to 0.5, percent by weight.

In the case of application before the emergence, the applied amounts may be varied within a fairly wide range. In general, the work is accomplished with applied amounts of 0.5–20 kg./hectare, preferably 1–15 kg./hectare, of active compound.

The herbicidal activity of the compounds used in this invention is illustrated by the following Examples.

The test compounds are identified by structure and their number in Table 1, supra.

EXAMPLE A

Pre-emergence test

Solvent: 5 parts by weight acetone.

Emulsifier: 1 part by weight alkylarylpolyglycol ether.

To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After three weeks, the degree of damage to the test plants was determined and characterized by the values 0–5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The active compounds, the amounts applied and the results obtained can be seen from Table A.

TABLE A
Pre-emergence test

| Active compound | Applied amount, kg./hectare | Beets | Galin-soga | Urtica | Stella-ria | Matri-caria | Lolium | Sinapis |
|---|---|---|---|---|---|---|---|---|
| Mixture of BIPC and OMU [1] in the weight ratio 16:11 (known). | 5 | 3 | 5 | 5 | 5 | 5 | 5 | 5 |
|  | 2.5 | 2 | 5 | 5 | 5 | 5 | 5 | 5 |
|  | 1.25 | 0-1 | 5 | 5 | 5 | 4 | 4 | 5 |
| 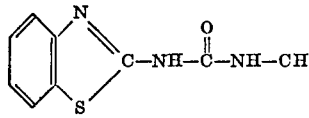 (known as herbicide) | 10 | 1-2 | 5 | 5 | 5 | 5 | 4-5 | 5 |
|  | 5 | 0 | 5 | 5 | 5 | 5 | 4-5 | 4 |
|  | 2.5 | 0 | 4-5 | 5 | 5 | 4-5 | 4-5 | 3 |
|  | 1.25 | 0 | 3 | 4 | 4 | 4 | 3 | 2 |
| 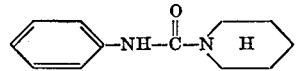 (Compound 1) | 10 | 1 | 5 | 5 | 5 | 5 | 5 | 5 |
|  | 5 | 0 | 5 | 5 | 5 | 5 | 5 | 5 |
|  | 2.5 | 0 | 5 | 5 | 5 | 5 | 4-5 | 5 |
|  | 1.25 | 0 | 5 | 4 | 4 | 4 | 4 | 4-5 |
| 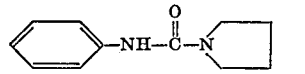 (Compound 2) | 10 | 3-4 | 5 | 5 | 5 | 5 | 5 | 5 |
|  | 5 | 1-2 | 5 | 5 | 5 | 5 | 5 | 5 |
|  | 2.5 | 0-1 | 5 | 5 | 5 | 5 | 4-5 | 5 |
|  | 1.25 | 0 | 5 | 5 | 5 | 5 | 4 | 5 |

[1] BIPC=N-(3'-chlorophenyl)-(1-butin-3-yl)carbamate; OMU=N-cyclooctyl-N',N'-dimethyl urea.

EXAMPLE B

Post-emergence test

Solvent: 5 parts by weight acetone.
Emulsifier: 1 part by weight alkylarylpolyglycol ether.
To produce a suitable preparation of active compound, 1 part by weight of active compound was mixed with the stated amount of solvent, the stated amount of emulsifier was added and the concentrate was then diluted with water to the desired concentration.
Test plants which have the height of about 5–15 cm. were sprayed with the preparation of the active compound until just dew moist. After three weeks, the degree of damage to the plants was determined and characterized by the values 0–5, which have the following meaning:

0 no effect
1 a few slightly burnt spots
2 marked damage to leaves
3 some leaves and parts of stalks partially dead
4 plant partially destroyed
5 plant completely dead The active compounds, their concentrations and the results obtained can be seen from Table B.

TABLE B
Post-emergence test

| Active compound | Applied amount, kg./hectare | Beets | Galin-soga | Urtica | Stellaria | Matri-caria | Sinapis |
|---|---|---|---|---|---|---|---|
| 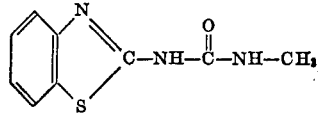 (known as herbicide) | 6 | 1-2 | 5 | 5 | 5 | 5 | 5 |
|  | 4 | 0-1 | 5 | 5 | 5 | 5 | 5 |
|  | 2 | 0 | 3 | 4 | 3 | 4 | 5 |
| 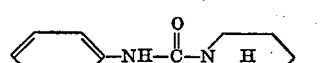 (Compound 1) | 8 | 2 | 5 | 5 | 5 | 5 | 5 |
|  | 4 | 1 | 5 | 5 | 5 | 5 | 5 |
|  | 2 | 0 | 5 | 5 | 4 | 4 | 4-5 |
| 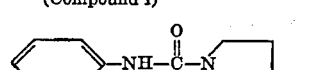 (Compound 2) | 8 | 3-4 | 5 | 5 | 5 | 5 | 4 |
|  | 4 | 3 | 5 | 5 | 5 | 5 | 5 |
|  | 2 | 2-3 | 4-5 | 5 | 4-5 | 3 | 4-5 |

EXAMPLE C

Pre-emergence test/outdoors/spray powder

Active compound: 70 parts by weight.
Inert carrier material: 21 parts by weight.
Dispersing auxiliary: 9 parts by weight.

To produce a suitable spray liquor, the necessary amounts of active compound were mixed with the stated amount of formulation auxiliaries, and the concentrate was diluted with water to the desired concentration.

On the day of the sowing out of the sugar-beets outdoors, the individual plots were sprayed with 500 liters/hectare of the preparation of active compound so that a uniform wetting of the soil surface was achieved. The applied amount of active compound per unit area, which is stated in Table C, is decisive.

After 5 weeks, the degree of damage and the thinning out of the sugar-beets, as well as the degree of damage to the weeds, were determined and stated as a percentage with respect to the untreated control.

The active compound, applied amounts and results can be seen from Table C. The values stated in the Table are mean values from two experiments.

TABLE C
Pre-emergence test—outdoors

| Active compound | Active compound applied, kg./hectare | Beets Damage, percent | Beets Thinning out, percent | Chenopodium album | Stellaria media | Lamium spec. | Polygonum spec. | Matricaria spec. | Poa annua |
|---|---|---|---|---|---|---|---|---|---|
| ⟨⟩—NH—C(=O)—N⟨H⟩ (Compound 1) | 8 | 4 | 17 | 100 | 100 | 100 | 100 | 100 | 100 |
|  | 6 | 2.5 | 7 | 100 | 98 | 100 | 100 | 100 | 99 |
|  | 4 | 0 | 4 | 97 | 97 | 98 | 98 | 97 | 98 |

EXAMPLE D

Post-emergence test/outdoors/spray powder

Active compound: 70 parts by weight.
Inert carrier material: 21 parts by weight.
Dispersing auxiliary: 9 parts by weight.

To produce a suitable spray liquor, the active compound was mixed with the stated amount of formulation auxiliaries, and the concentrate was then diluted with water to the desired concentration.

Plots outdoors with sugar-beets in the 3-leaf stage were sprayed with 500 liters/hectare of the preparation of active compound so that a uniform wetting of the plants was ensured. Decisive is the applied amount of active compound per unit area. After four weeks the degree of damage to the plants was determined and recorded as a percentage with respect to the untreated control.

The active compounds, applied amounts and results can be seen from Table D. The values stated in the Table are mean values from two experiments.

TABLE D
Post-emergence test—outdoors

| Active compound | Active compound applied, kg./hectare | Beets Damage, percent | Beets Thinning out, percent | Chenopodium album | Stellaria media | Capsella bursa pastoris |
|---|---|---|---|---|---|---|
| ⟨⟩—NH—C(=O)—N⟨H⟩ (Compound 1) | 8 | 0 | 0 | 95 | 95 | 98 |
|  | 6 | 0 | 0 | 90 | 90 | 95 |
|  | 4 | 0 | 0 | 75 | 75 | 75 |

It will be understood that the specification and examples are illustrative but not limitative of the present invention and that other embodiments within the spirit and scope of the invention will suggest themselves to those skilled in the art.

What is claimed is:

1. Method of combatting undesired vegetation in beet cultivations, which method comprises applying to the locus thereof a herbicidally effective amount of N-phenyl-N',N'-pentamethylene-urea.

References Cited
UNITED STATES PATENTS

| | | | |
|---|---|---|---|
| 3,288,851 | 11/1966 | Martin et al. | 71—120 |
| 3,234,275 | 2/1966 | Malz et al. | 71—94 |
| 3,637,795 | 1/1972 | Krenzer et al. | 71—120 |

OTHER REFERENCES

Good, "Inhibitors of the Hill Reaction" (1961), CA 56, pp. 7714-15 (1962).

Thompson et al., "New Growth Regulating Compounds, etc." (1946), CA 14, pp. 302, 07-12 (1947).

G. HOLLRAH, Primary Examiner

U.S. Cl. X.R.
71—88, 95